M. A. BAKER.
AUTOMOBILE TRANSFER TURN TABLE.
APPLICATION FILED MAR. 16, 1910.
968,230.
Patented Aug. 23, 1910.
2 SHEETS—SHEET 1.
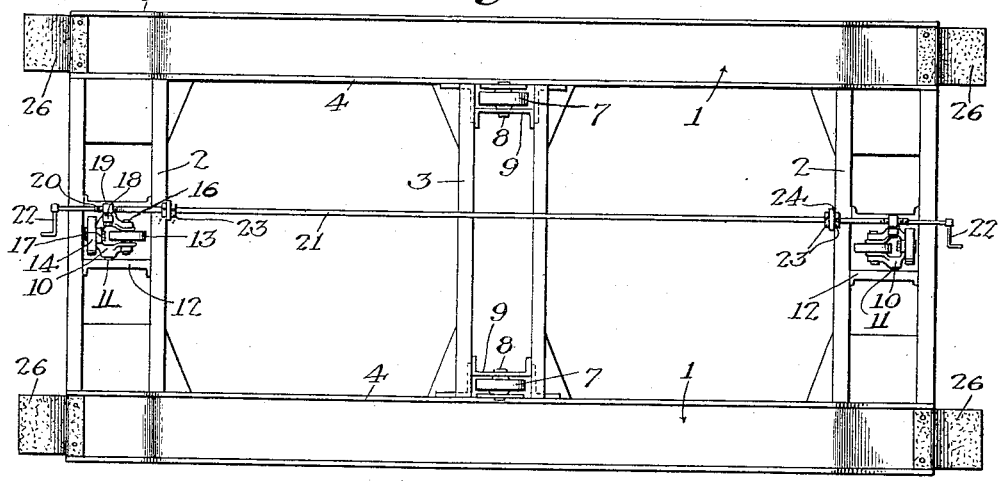
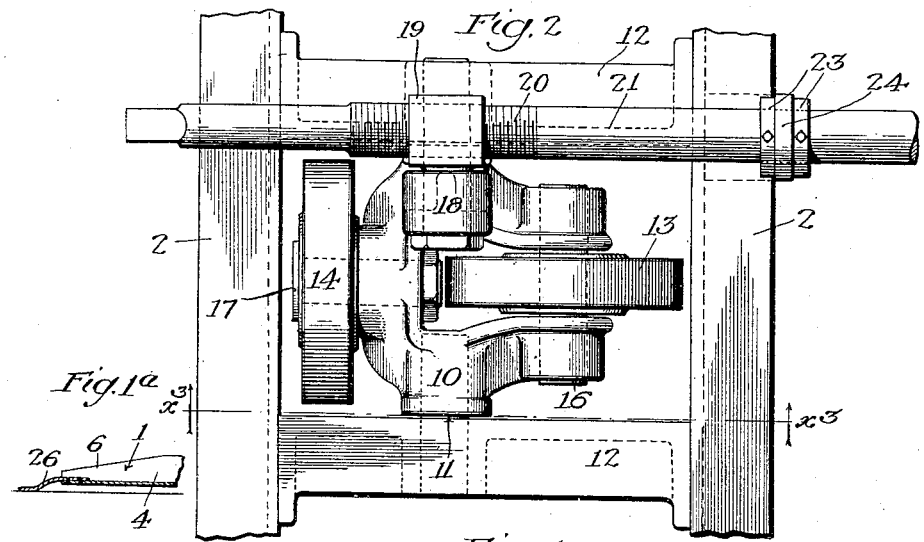
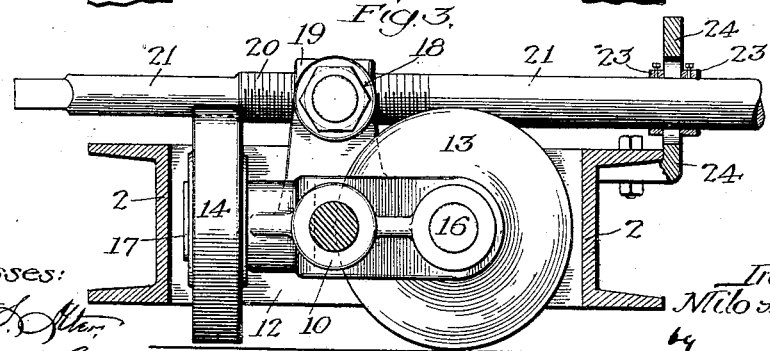
Witnesses:
Inventor:
Milo A. Baker,
by Townsend & Hackle,
attys.

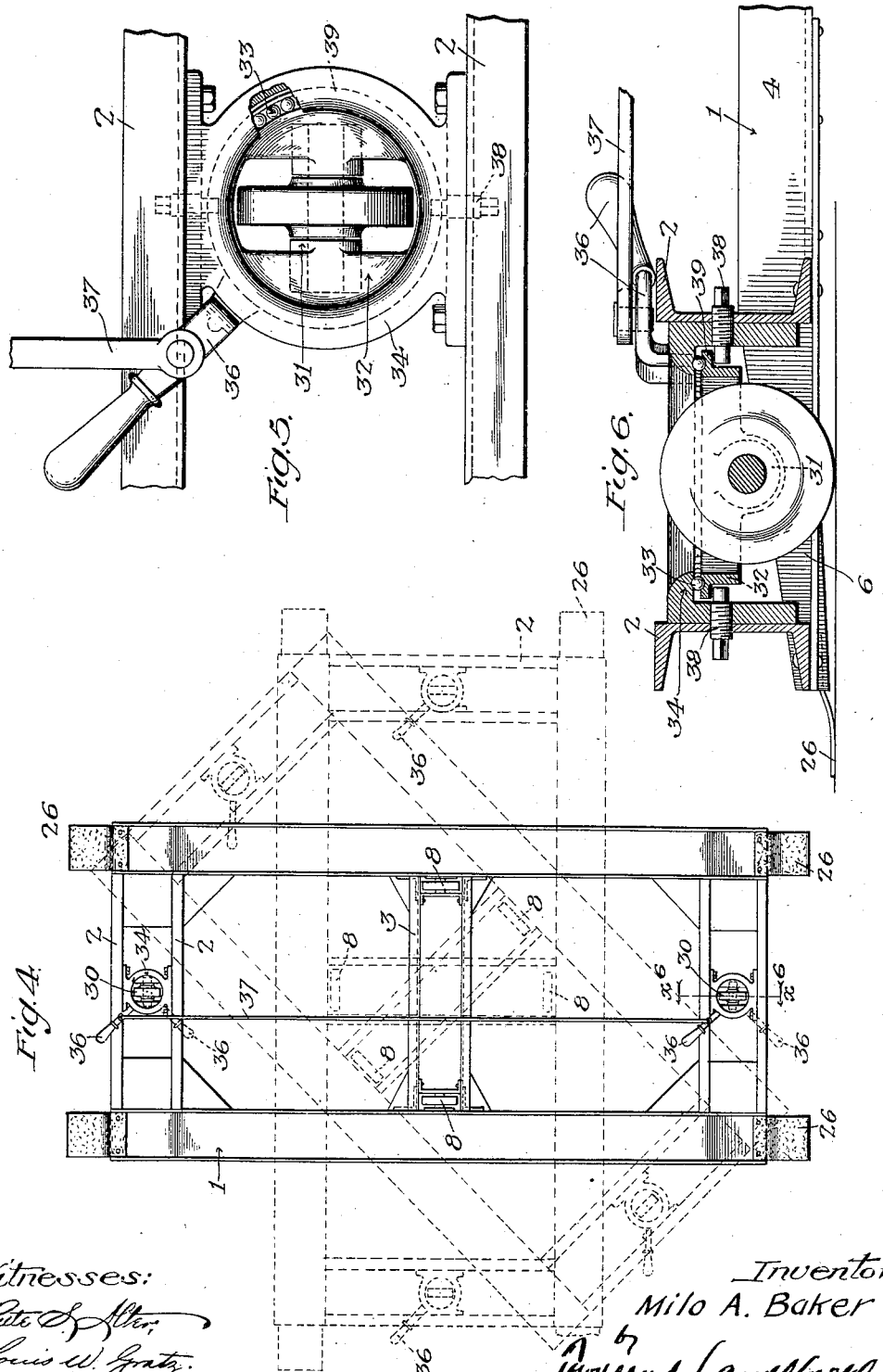

UNITED STATES PATENT OFFICE.

MILO A. BAKER, OF LOS ANGELES, CALIFORNIA.

AUTOMOBILE-TRANSFER TURN-TABLE.

968,230.  Specification of Letters Patent.  Patented Aug. 23, 1910.

Application filed March 16, 1910.  Serial No. 549,759.

*To all whom it may concern:*

Be it known that I, MILO A. BAKER, a citizen of the United States, residing at Los Angeles, in the county of Los Angeles and State of California, have invented a new and useful Automobile-Transfer Turn-Table, of which the following is a specification.

This invention relates to a turn-table for use in garages and similar locations where it is desired to turn automobiles in a limited space.

The main object of the present invention is to provide an automobile transfer turn-table upon which the automobile may be run and may then be turned bodily with the turn-table.

A further object of the invention is to provide an automobile turn-table which can be utilized for transportation or for turning of the automobile as desired.

The accompanying drawings illustrate the invention, and referring thereto: Figure 1 is a plan of one form of the invention. Fig. 1$^a$ is a detail section of the inclined portion of the automobile ways. Fig. 2 is a plan of one of the supporting means for the truck. Fig. 3 is a vertical section on line $x^3$—$x^3$ in Fig. 2. Fig. 4 is a plan of another form of the turn-table. Fig. 5 is a plan of one of the supporting wheels therefor. Fig. 6 is a vertical section on line $x^6$—$x^6$ in Fig. 4.

Referring to Fig. 1, the turn-table comprises a frame formed with side bars 1, end bars or members 2 and a central member 3. Side bars or members 1 are formed as channel irons having raised walls 4, the web portions of said channel irons being bent or inclined downwardly, as shown at 6, so as to approach the floor and enable the automobile to be run onto said guide-ways.

Truck or supporting wheels are provided for the frame 1, there being preferably two wheels 7 journaled by pivots 8 in bearings 9 at each end of the central cross member 3 and a supporting means 10 at each end of the frame 1 mounted in a cross member 2 thereof. Each supporting member 10 may consist of a frame journaled by pivots 11 in bearings 12 on a cross member 2 and two supporting wheels 13 and 14 journaled on said frame 10, the pivots or journal pins 16, 17 of said supporting wheels being at right angles to one another, so that the wheel 13 is adapted to run on the floor in a fore and aft direction and the wheels 14 are adapted to run on the floor in lateral motion. Means are provided for bringing said wheels alternatively into contact with the floor, the frame 10 being pivoted at 11 as stated and having a swivel connection 18 with a nut 19 engaging with a screw-threaded portion 20 of a longitudinal rod 21 which extends the full length of the main frame and is provided with an operating handle 22 at each end thereof and with collars 23 fixed thereon and engaging with fixed brackets 24 to prevent longitudinal movement of the rod, so that on rotation of the handles 22 the screw-threaded portions of said rod will operate the nuts 19 to tip the rocking frames 10 forwardly or rearwardly, thereby bringing either the wheel 13 or the wheel 14 into contact with the floor.

Guide-ways or members 1 of the frame are preferably provided with flaps or strips 26 of leather at the ends thereof, said flaps resting on the floor and serving as a tractive surface for the automobile wheels in running onto the guide-ways, thereby preventing the said wheels from pushing the frame bodily and enabling the automobile to be propelled up onto the guide-ways.

The operation is as follows: The automobile is run onto the ways 1 and the turn-table may then be operated to turn the automobile by moving the handles 22, so as to bring the wheels 14 into contact with the floor, so that the said wheels permit the turn-table to be swung on its center turning the automobile to any desired angle. When it is desired to move the turn-table longitudinally, for example, to transport the same into position for running the automobile thereonto, the handle 22 may be operated to bring the wheels 13 into contact with the ground, the turn-table then traveling on the two wheels 13 and the two wheels 8.

In the form of the invention shown in Figs. 4 to 6, the turn-table frame is provided with side members 1 and cross members 2, 3, as above described, and with central wheels 8, but a single supporting wheel 30 is provided at each end, said supporting wheel being journaled in bearings 31 in a member 32 mounted by a ball bearing 33 in a fitting 34 mounted on the cross members 2, the rotatable member 32 being provided with an operating handle 36, the handles at the fore and rear ends of the main frame being connected by a rod 37. Rotary member 32 may be retained in position by screw plugs 38 engaging under a flanged portion 39 of said member. The operation of this form of the invention is similar to that above described, except that the supporting wheels 30 are simply turned in fore and aft planes or in transverse planes according to whether the turn-table frame is to be transported longitudinally or is to be rotated in turning the automobile.

What I claim is:—

1. An automobile transfer turn-table comprising a frame provided with ways having inclined end portions, supporting wheels located at the mid length of said frame, and mounted in planes parallel with the longitudinal axis of the frame and supporting wheels at the front and rear ends of the frame, said front and rear supporting wheels being movable bodily into and retained in fixed position parallel to the first named wheels or at right angles thereto for running longitudinally on the floor or for running transversely with reference to the frame.

2. An automobile transfer turn-table comprising a frame provided with ways to receive the automobile, said ways being inclined at the end, supporting wheels at the mid length of said frame, supporting means at each end of the frame comprising a member pivoted on the frame, a wheel journaled on said member to rotate in a plane transverse to the frame, a wheel journaled on said member to rotate in a plane extending longitudinally of the frame, and operating means connected to said member to bring said wheels on said member alternatively into contact with the floor.

3. An automobile transfer turn-table comprising a frame having longitudinal ways thereon, said ways being inclined at the end, flexible flaps secured to said frame at the ends of said ways, and supporting wheels for said frame mounted to permit alternatively of longitudinal and transverse turning movement of the frame.

In testimony whereof, I have hereunto set my hand at Los Angeles, California, this 10 day of March 1910.

MILO A. BAKER.

In presence of—
G. T. HACKLEY,
FRANK L. A. GRAHAM.